United States Patent Office 3,067,851
Patented Dec. 11, 1962

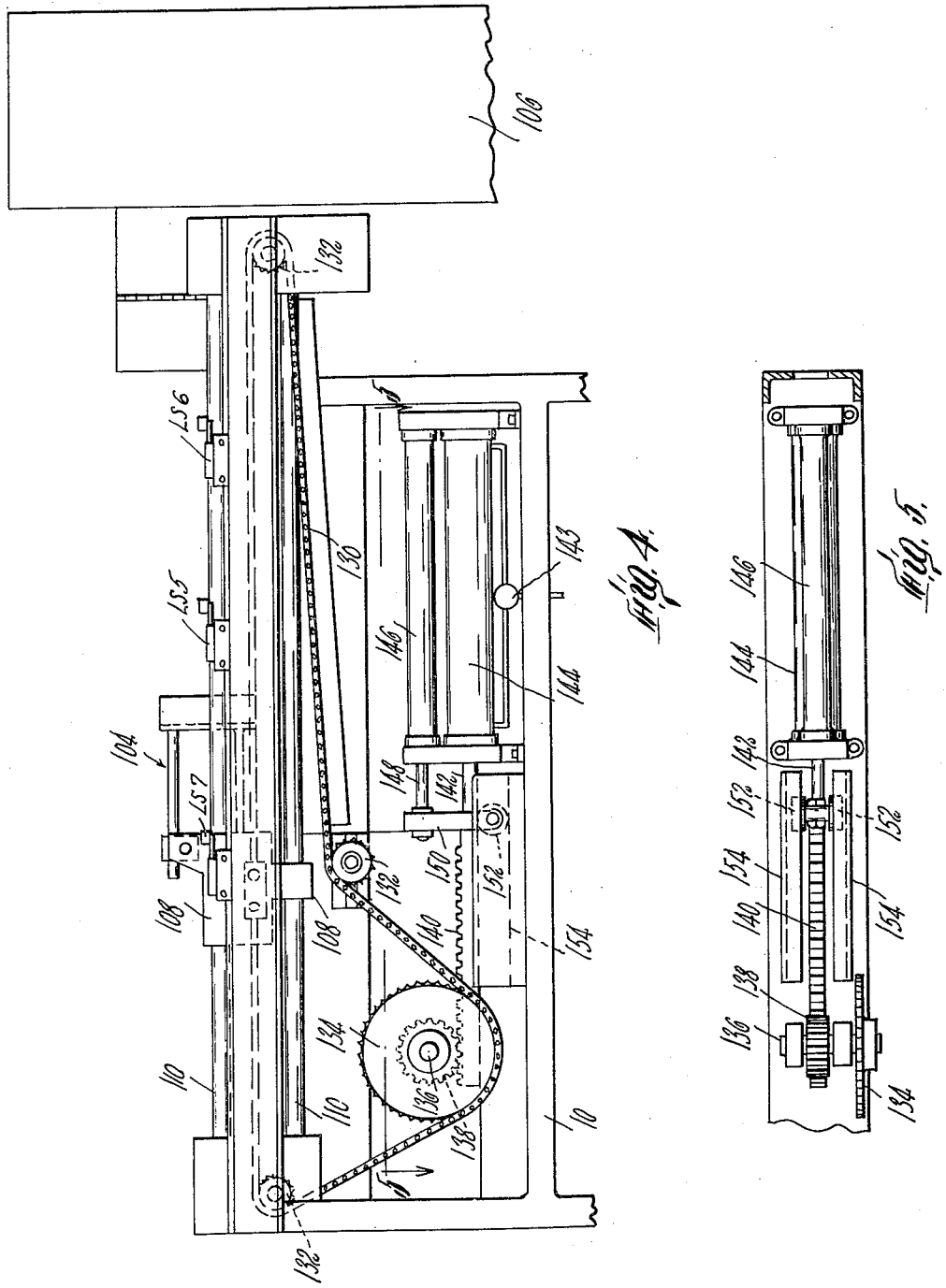

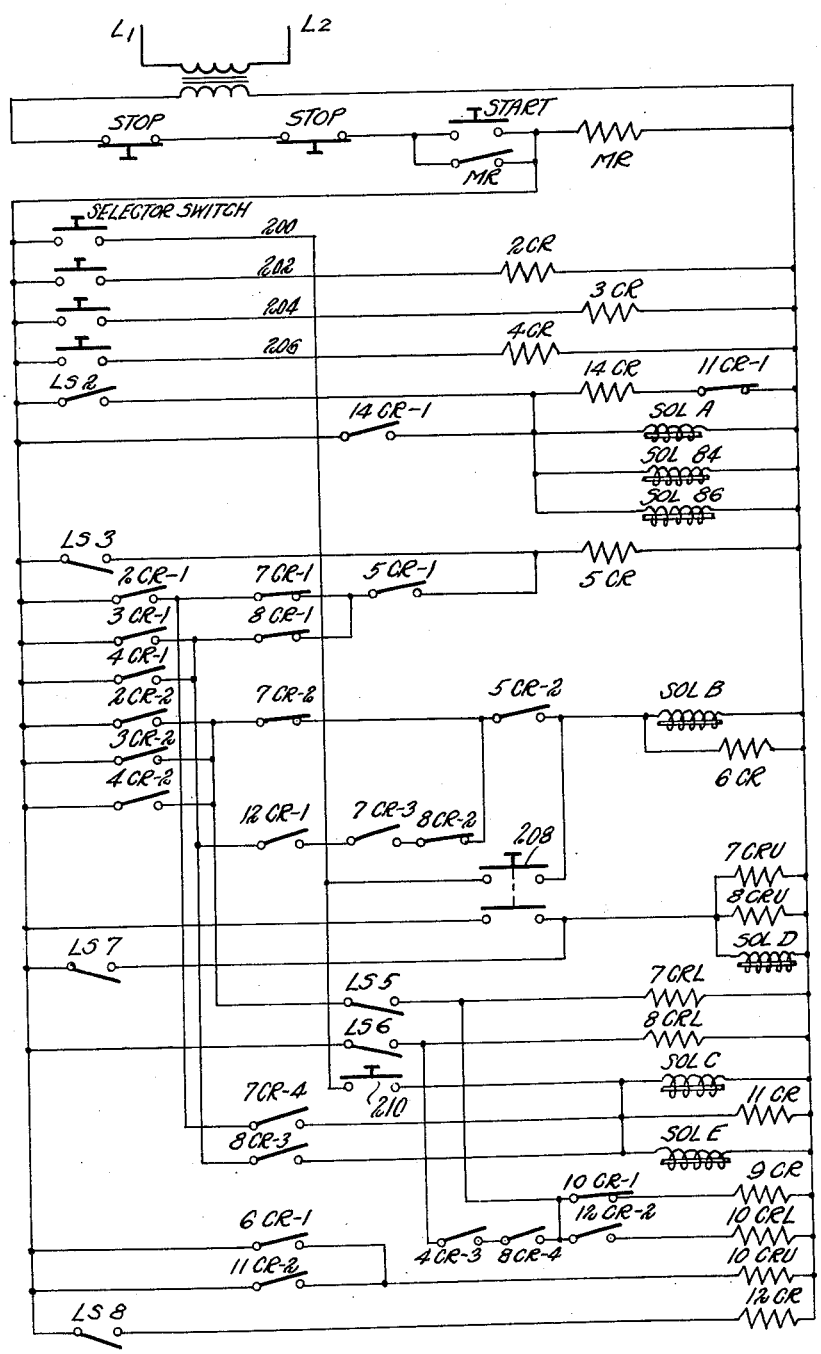

3,067,851
ARTICLE FEEDING DEVICE
John R. O'Rourke, Jr., Cranston, R.I., assignor to Bostitch, Inc., East Greenwich, R.I., a corporation of Rhode Island
Filed Mar. 7, 1961, Ser. No. 93,957
10 Claims. (Cl. 198—24)

This invention relates to a feeding apparatus for providing an intermittent feed of articles to an operating station and pertains more specifically to apparatus for receiving articles from a continuous feed device and supplying the articles at spaced intervals to an operating station or machine at which a substantial dwell occurs for completion of an operation on the article.

One object of the present invention is to provide apparatus for converting a continuously advancing supply of successive individual articles into an intermittent supply with a controlled dwell between individual articles to permit performance of an operation thereon.

Another object is to provide apparatus for intermittently supplying successive stacks of items to an operating station and for squaring said stacks before delivery to the operating station.

Still another object is to provide a feed mechanism for feeding stacks of items to a tying machine for tying the stacks into bundles.

Still a further object is to provide feed apparatus of the type described which is readily adjustable to handle articles of different sizes.

Other and further objects will be apparent from the drawings and from the description which follows.

In the drawings:

FIG. 4 is a view in side elevation taken from the right-hand side of FIG. 1;

FIG. 5 is a view in horizontal section, partly broken away, taken along line 5—5 of FIG. 4;

FIG. 10 is a circuit diagram showing the electrical means for controlling the operation of the apparatus.

Figure 1:
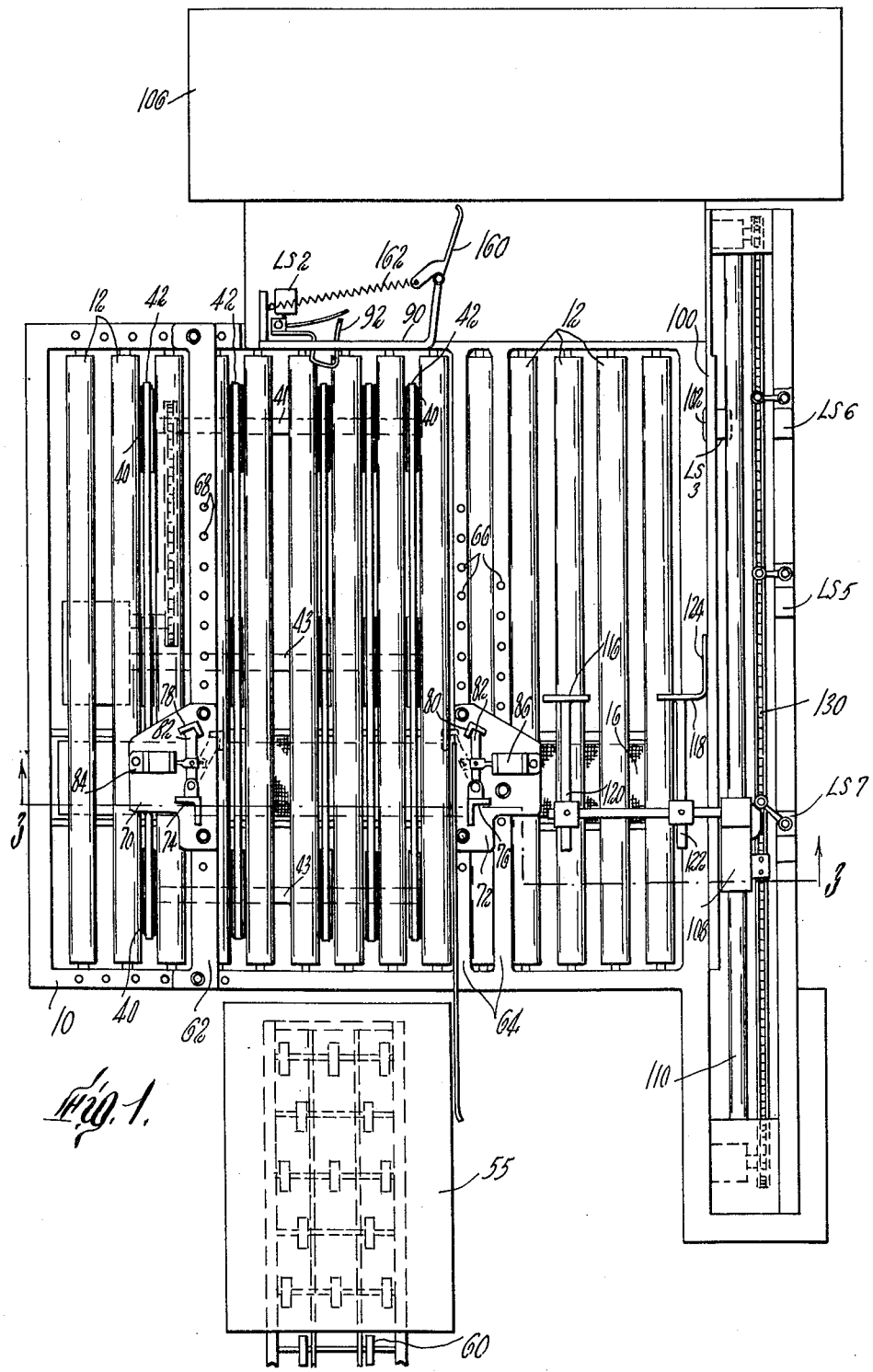
FIG. 1 is a plan view of one embodiment of the present invention.
Figure 2:
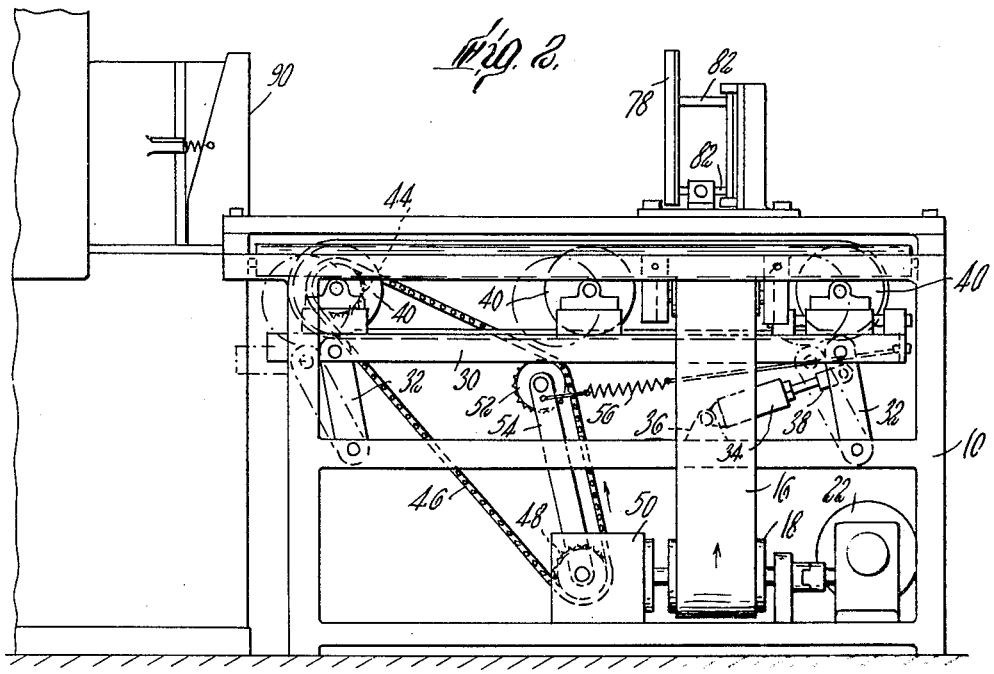
FIG. 2 is a view in side elevation taken from the left-hand side of FIG. 1.
Figure 3:
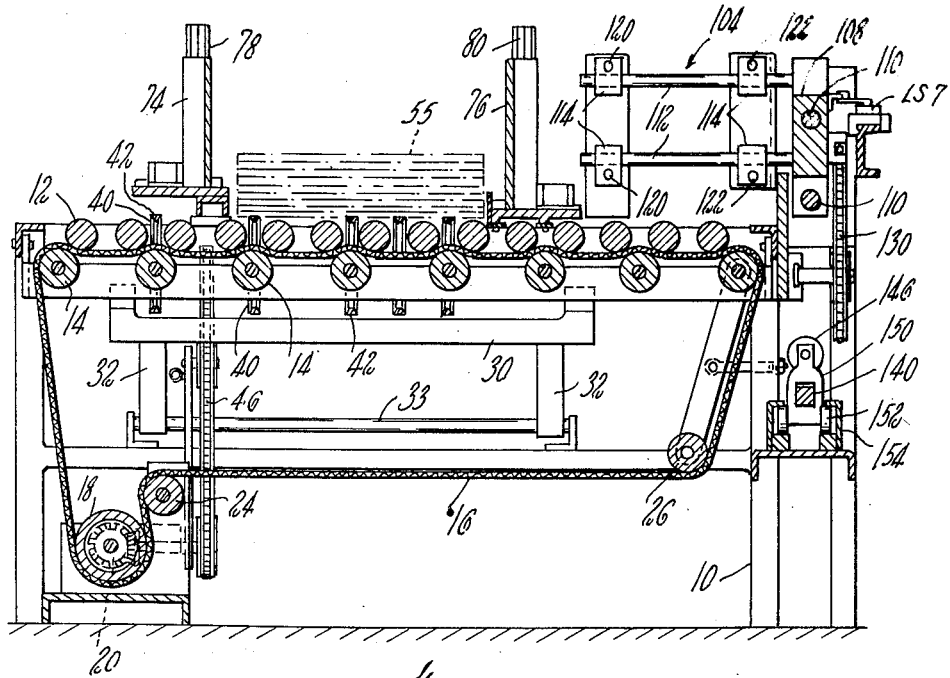
FIG. 3 is a view in vertical section taken along line 3—3 of FIG. 1.

As shown in FIGS. 1 to 4 of the drawing, the embodiment of the invention which is illustrated comprises a generally rectangular angle-iron frame 10 on which are journaled conveyor rollers 12, 12 arranged parallel to and spaced from each other. Also journaled on frame 10 are friction drive rollers 14, 14 (FIG. 3) each of which is mounted beneath and between an adjacent pair of conveyor rollers 12. Threaded between rollers 12, 14 is a continuous flexible drive belt 16 driven from pulley 18 which in turn is driven through bevel gears 20 from electric motor 22. Idler pulleys 24, 26 are journaled on frame 10 to guide the idling reach of drive belt 16. The top surface of conveyor rolls 12 are adapted to support and advance articles resting thereon from left to right as seen in FIGS. 1 and 3.

An auxiliary frame 30 (FIGS. 2 and 3) is mounted on toggles or links 32, 32 which in turn are pivoted on shafts 33 secured to main frame 10. A pneumatic cylinder 34 pivoted to a bracket 36 on frame 10 has its piston 38 pivotally secured to the midportion of one of links 32. Movement of piston 38 to and from advanced and retracted position serves to raise and lower auxiliary frame 30. Movement of the piston is controlled by a conventional air valve (not shown) actuated by solenoid A (FIG. 10).

As best appears in FIGS. 1–3, a plurality of aligned V-belt pulleys or sheaves 40, 40 are mounted on shafts 41, 43, 43 journaled in pillar blocks fixed to auxiliary frame 30, the pulleys 40, 40 being intercalated between several adjacent pairs of conveyor rolls 12, 12 at the left-hand side of the array of conveyor rollers 12 as seen in FIG. 1. In the embodiment shown, a set of three such pulleys 40 is arranged in alignment between each adjacent pair of rolls 12, but it will be understood that the number of such pulleys in a set may vary depending upon the length of auxiliary frame 30 and the weight of the articles to be handled. Trained about each aligned set of pulleys 40 is an endless V-belt 42 the upper reach of which extends above the top surface of conveyor rolls 12, 12 when auxiliary frame 30 is in elevated position and lies below the top surfaces of rolls 12, 12 when auxiliary frame 30 is in lowered position. Fixed to shaft 41 is sprocket 44 driven by means of chain 46 from sprocket 48 which in turn is driven through gear box 50 from motor 22. An idler sprocket 52 is journaled on one end of lever arm 54, the other end of which is pivoted on gear box 50. A tension spring 56 secured between lever arm 54 and frame 10 serves to maintain the idling reach of chain 46 in taut condition in all positions of auxiliary frame 30. A conventional idler roller conveyor 60 (FIG. 1) serves to supply articles such as a stack 55 of cardboard sheets to one end of the upper reach of belts 42.

A bridge bar 62 (FIG. 1) is bolted to opposite ends of main frame 10 and extends above belts 42 and rollers 12. A plurality of bolt holes are provided in frame 10 to permit securing bridge bar 62 in any one of a number of different positions. Arranged between adjacent pairs of conveyor rollers 12 at the right-hand side of the array of belts 42, as seen in FIG. 1, are transverse support members 64, 64 each of which has its opposite ends secured to frame 10 and each of which is provided with a plurality of bolt holes 66, 66 in its upper face. A corresponding set of bolt holes 68 is provided in the upper face of bridge bar 62. Brackets 70, 72 are bolted to bridge bar 62 and transverse support members 64, 64 in any one of a plurality of desired locations. Each bracket 70, 72 has secured to it an upright 74, 76 on which is pivotally mounted a clamp 78, 80 by means of supporting arms 82, 82, the clamps and supporting arms being mounted for movement about a vertical axis to and from an open position as shown in solid lines in FIG. 1 and a clamping position shown in dotted lines. Movement of the clamps 78, 80 is controlled by means of solenoids 84, 86, the armatures of which are secured to supporting arms 82, 82.

A stop 90 (FIG. 2) having a vertical wall or abutment is fixed to frame 10 beyond the end of the upper reach of belts 42 in position to halt the forward movement of any articles being carried by the belts. A spring-loaded switch control arm 92 (FIG. 1) is pivotally mounted immediately behind stop 90 with a portion of control arm 92 extending through an aperture in stop 90 in position to be engaged by an article before the article reaches stop 90 and to be urged rearwardly through the aperture by the article. Switch arm 92 is arranged to actuate switch LS2 mounted on the rear of stop 90.

At the right-hand side of the apparatus as seen in FIG. 1 and secured to frame 10 is a second stop 100 having a vertical abutment or wall which is arranged to halt at a transfer station the advance of any article carried by the upper surfaces of conveyor rollers 12. A yieldably mounted switch control arm 102 extends through an aperture in stop 100 in position to be engaged by an article as it approaches the stop, control arm 102 being arranged to actuate switch LS3 mounted behind stop 100. Mounted adjacent the transfer station for movement in a direction parallel to the longitudinal axis of rolls 12, 12 and transversely of the direction of advance of articles carried thereby is a pusher indicated generally by the numeral 104 (FIGS. 3 and 4). The pusher, which is adapted to push an article from the transfer station to an operating station 106, comprises a carrier 108 slidably mounted on a pair of rails 110, 110. Projecting laterally from carrier 108 are a pair of support rods 112 to which are adjustably secured clamping members 114, 114. A pair of generally vertically extending pusher elements 116, 118 is secured to support arms 120, 122 which in turn are adjustably clamped in clamping members 114, 114. Pusher element 118 is provided with a lateral flange 124 which serves as an extension of the stop 100 in abutting against the face of an article advanced by conveyor rollers 12.

The drive mechanism for advancing and retracting pusher 104 from its retracted position (shown in FIGS. 1 and 4) to the advanced position (shown in dotted lines in FIG. 9) comprises a chain 130 (FIG. 4) having a horizontal upper reach supported on idler sprockets 132, 132 journaled on frame 10 to which is secured carrier 108. Chain 130 is driven from sprocket 134 keyed to shaft 136 to which is fixed pinion 138 which in turn is engaged by rack 140 mounted on the end of piston 142 of pneumatic cylinder 144 which is fixed to frame 10. A hydraulic check or control cylinder 146 is also fixed to frame 10 and carries a piston 148 which is tied to pneumatic piston 142 by means of link 150. Link 150 also carries a pair of rollers 152, 152 running in closed tracks 154, 154 secured to frame 10. Because pinion 138 is smaller in diameter than sprocket 134, this arrangement provides for multiplication of the traverse of piston 142 and rack 140, making it possible to employ relatively short pistons 142, 148 while achieving extensive movement of pusher 104. Switches LS5, LS6, and LS7 are adjustably secured to frame 10 adjacent the path of travel of carrier 108, each switch having a control arm in position to be actuated by carrier 108 as it passes. Two-way air valve 143 (FIG. 4) is controlled by solenoids C and D (FIG. 10). These switches and valve serve to control the operation of the drive mechanism of the pusher.

In one preferred embodiment of the present invention, the operating station 106 comprises a tying machine of known construction, as described for example in British Patent 820,866, which ties a cord or wire about a stack of items delivered by pusher 104. Upon completion of one or more operations at the operating station, the article is moved out of the operating station by contact with the next successive article being advanced into the operating station by pusher 104.

A movable guide fence 160 is pivoted on stop 90 and urged by spring 162 toward stop 100, as seen in FIG. 1, so that as stack 55 is pushed from the transfer station to operating station 106, guide fence 160 continually urges it to squared condition.

*Operation of Apparatus*

Figure 6:
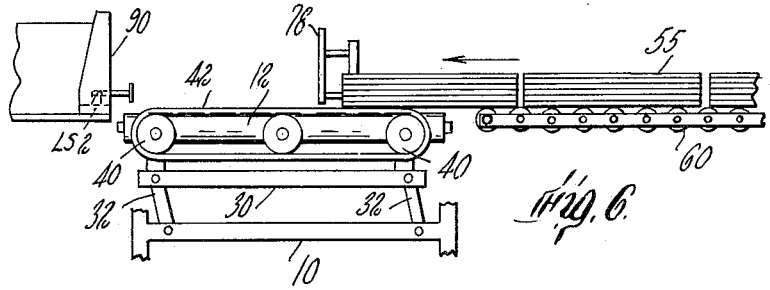
FIG. 6 is a view similar to FIG. 2, with parts omitted for the sake of clarity, showing the device in position to receive a stack of items.
Figure 7:
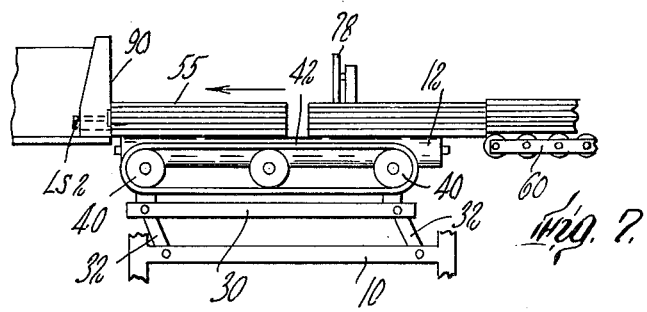
FIG. 7 is a view corresponding to FIG. 6 showing the stack advanced to the first squaring position.

Motor 22 runs continuously so that conveyor rolls 12 and belts 42 are continuously driven. The selector switch (see FIG. 10) is actuated to one of four possible positions 200, 202, 204, 206. In position 200, the apparatus is arranged for manual control of the pusher, while in each of the remaining positions control of the pusher is automatic, as will be described hereinafter. Auxiliary frame 30 is initially in the elevated position so that the upper reach of belts 42 is above the top surfaces of rolls 12, and the stack 55 is carried forward by the belts as shown in FIG. 6 until it strikes switch arm 92, closing switch LS2 actuating solenoid A controlling pneumatic cylinder 34 and causing the auxiliary frame to drop to its lowered position. At the same time solenoids 84 and 86 are actuated to move clamps 78, 80 to clamping position and prevent further advance of the stack next following stack 55. The time lag inherent in operation of the pneumatic cylinder 34 together with the inertia of stack 55 causes the stack to continue to advance, pushing switch arm 92 through the aperture in stop 90 until it is halted by and squared against stop 90, as shown in FIG. 7.

Figure 8:
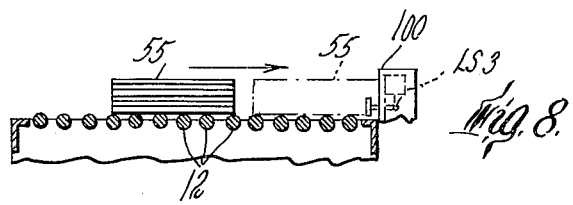
FIG. 8 is a view corresponding to FIG. 3, with parts omitted for the sake of clarity, showing the movement of the stack to the transfer station.

As soon as belts 42 drop below the top surface of rolls 12, depositing the stack on these continuously rotating rolls, it is advanced to the right as seen in FIG. 8 to the transfer station where it is halted by stop 100, being squared against stop 100 and flange 124. Switch LS2 opens again as soon as the stack passes it, but solenoids A, 84 and 86 continue to be actuated by the circuit through control relay 14CR and its switch 14CR–1 and through normally-closed switch 11CR–1, so that belts 42 are maintained in lowered position and clamps 78, 80 are maintained in clamping position.

Figure 9:
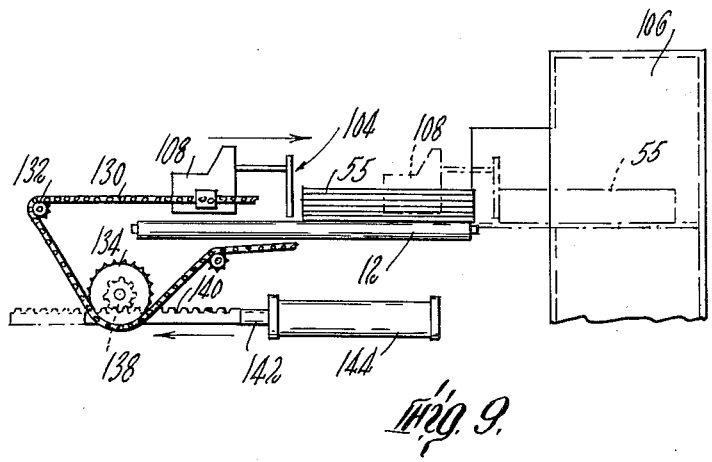
FIG. 9 is a view similar to FIG. 4, with parts omitted for the sake of clarity, showing the movement of the stack from the transfer station to the operating station.

As the stack reaches stop 100, it engages the arm of switch LS3, closing this normally-open switch and energizing control relay 5CR to close its two switches. If the selector switch is in position 200, the operation proceeds no further because control relays 2CR, 3CR and 4CR are all unenergized, and their associated switches, which are in series with the 5CR switches, remain open. If carrier 108 is in its rearmost position, switch LS7 will be closed by the carrier, energizing solenoid D to open a valve admitting a supply of compressed air to the right-hand end of cylinder 144 as seen in FIG. 9, but the piston 142 will be restrained by hydraulic control cylinder 146. It is then necessary to close manually double-pole push-button switch 208 to energize solenoid B. If switch LS7 is open, it will be by-passed by the second pole of push-button switch 208. Energization of solenoid B opens a check valve in hydraulic control piston 148 permitting it to be carried forward by pneumatic piston 142, thus advancing pusher 104 on its carrier 108. Advance of the pusher continues as long as switch 208 is held closed because switch LS5 is inactivated by open switch 2CR–2, and the closing of switch LS6 with the accompanying energization of the latching coil 8CRL and the changing of the several 8CR- switches does not affect the circuit. As soon as switch 208 is released, solenoid B is deenergized, closing the hydraulic check valve and stopping the advance of piston 142 and its connected rack 140, so that carrier 108 is also stopped. Because of the delay inherent in any such control system, carrier 108 and pusher 104 will not stop instantly but will continue on for a few inches; this overrunning must be allowed for in manual operation of the device.

To reverse pusher 104, push-button switch 210 may be manually actuated to energize solenoid C which changes the air-supply valve 143 to supply compressed air to the left-hand end of cylinder 144, as seen in FIG. 9. Since the valve in hydraulic control piston 148 is a check valve, this piston is free to move and to permit pneumatic piston 142 to move in the reverse direction until switch LS7 is closed by the carrier to energize solenoid D again. At the same time, closing of push-button switch 210 energizes control relay 11CR, opening switch 11CR–1 and deenergizing clamp solenoids 84 and 86 to release the next stack; closing of switch 210 also energizes solenoid E which serves to raise auxiliary frame 30 (solenoid A being deenergized by the opening of 11CR–1) and to start the operation of the tying machine or whatever other operation may be carried out at the operating station. The speed of retraction of piston 142 is sufficiently great so that pusher 104 has reached its rearmost position before the next successive stack of items, released by clamps 78, 80, has reached the transfer station.

When the selector switch is in position 202, the operation of the apparatus is the same as described above until the stack reaches the transfer station and closes switch LS-3. Since control relay 2CR is now energized through the selector switch and relay 5CR is energized through switch LS-3, solenoid B will be energized through switches 2CR-2, normally-closed 7CR-1, and 5CR-1, opening the check valve in hydraulic control piston 148. Pusher 104 being in its rearmost position, switch LS7 is closed so that solenoid D is energized, supplying compressed air to cylinder 144 to advance the pusher 104 with its carrier 108. Relay 5CR will continue to be energized through switches 2CR-1, normally-closed 7CR-1 and 5CR-1 even after switch LS-3 has been opened by movement of the stack toward the operating station. Relay 6CR is energized at the same time as solenoid B, which in turn causes energization of unlatching coil of relay 10CRU through 6CR-1, ensuring that switch 10CR-1 is closed to permit the closing of switch LS7 to energize the latching coil of relay 7CRL.

When carrier 108 reaches and momentarily closes switch LS5, energizing latching relay coil 7CRL through closed switch 2CR-2, all of the 7CR switches are changed and latched because the unlatching coil 7CRU has been deenergized by the opening of switch LS7. The opening of 7CR-1 deenergizes relay 5CR and returns the circuit to its original condition. The opening of switch 7CR-2 deenergizes solenoid B and stops the forward movement of carrier 108, with some overrun because of the lag in the system. This overrun must be allowed for in positioning the switch LS5 to provide for stopping the stack in the desired location. The momentary closing of switch LS5 also energizes relay 9CR through normally-closed switch 10CR-1 to start the operation of the tying machine or whatever other operation may be desired at the operating station. The closing and latching of switch 7CR-4 supplies power to solenoid C, reversing the compressed air supply valve 143 so that piston 142 is driven to the right as seen in FIG. 9, returning carrier 108 and pusher 104 to their starting position. The oil in control cylinder 146 passes freely through the check valve in piston 148 during this movement. Relay 11CR is also energized by the momentary closing of switch LS5, opening switch 11CR-1 and deenergizing 14CR so that the clamping solenoids 84, 86 are deenergized, releasing the next stack, and solenoid A is also deenergized. Simultaneously, solenoid E which raises auxiliary frame 30 is energized by the closing and latching of 7CR-4. This results in the next stack being advanced toward stop 90, and the operation is repeated. The article at operating station 106 may be carried away by a separate conveyor (not shown) after completion of the operation, or it may simply be pushed out of the station by the next successive article.

When the apparatus is feeding articles of relatively great length, it may be necessary to have pusher 104 give the article an additional push after completion of the operation performed at operating station 106 so that the rearwardly extending portion of the article will not block advance of the next article to the transfer station. In order to obtain this mode of operation the selector switch is changed to position 204 so that relay 3CR is energized. With the switch in this position, operation of the machine proceeds as described above until the article closes switch LS3, energizing relay 5CR which locks itself in by the closing of 5CR-1. Power is then supplied through 2CR-2, 7CR-2 and 5CR-2 to solenoid B, opening the check valve in oil piston 148 and permitting piston 142 to advance to the left as seen in FIG. 9, the air valve having been actuated by solenoid D, which is energized through switch LS7 when the carrier is in its rearmost position, to supply air to the proper end of cylinder 144 so that pusher 104 and carrier 108 push the article from the transfer station toward operating station 106.

When the carrier 108 momentarily closes switch LS5 during its advance, latching relay coil 7CRL is energized through 3CR-2, changing and latching all of the 7CR switches, and relay 9CR is energized through normally-closed switch 10CR-1 to start the operation desired at the operating station; e.g., the operation of tying machine. The opening of 7CR-2, deenergizing solenoid B, permits the check valve to close, stopping the advance of pistons 148 and 142 and of carrier 108 and pusher 104. However, the closing of 7CR-3 does not change the circuit because of normally-open switch 12CR-1 in series with it, and the closing of 7CR-4 is also ineffective because both 2CR-1 and 7CR-1 are now open.

Switch LS8 is closed by completion of the operation, e.g., the tying of a cord about the article, energizing relay 12CR to close switch 12CR-1. This reenergizes solenoid B through 3CR-1, 12CR, 7CR-3, 8CR-2 and 5CR-2, opening the check valve and permitting carrier 108 and pusher 104 to continue their advance until switch LS6 is closed by carrier 108. This energizes the latching coil of relay 8CRL, changing and latching all of the 8CR switches. The opening of 8CR-1 deenergizes 5CR and restores it to its original condition. The opening of 8CR-2 deenergizes solenoid B, stopping the advance of pistons 148 and 142 and stopping the advance of carrier 108 and of pusher 104 at a position sufficiently advanced so that the rear of the article at the operating station will clear the next article as it is advanced from stop 90 to stop 100. The closing of 8CR-3 energizes solenoid C, changing the air supply valve 143 to drive carrier 108 rearwardly; it also energizes relay 11CR to open switch 11CR-1, deenergizing solenoid A. Since the closing of 8CR-3 also energizes solenoid E, auxiliary frame 30 is raised, and the opening of 11CR-1 deenergizes clamping relays 84, 86 to release the next article. The closing of 8CR-4 has no effect because 4CR-3 remains open. The operation is then repeated.

The apparatus is also adapted to carry out two successive operations upon the same article, e.g., the tying of two cords about the article, the first near one end, the second near the other. For this purpose the selector switch is provided with a fourth position 206, in which position relay 4CR is energized to close switches 4CR-1, 4CR-2 and 4CR-3. The operation of the device is the same until the advancing article closes switch LS3 and energizes relay 5CR which locks in through 4CR-1, 8CR-1 and 5CR-1. Solenoid B (opening the oil check valve) is energized through 4CR-2, 7CR-2, and 5CR-2, permitting the article to be advanced by pusher 104 until switch LS5 is momentarily closed, whereupon the latching coil of relay 7CRL is energized to change and latch all of the 7CR switches, and relay 9CR is energized through normally-closed switch 10CR-1 to start the desired operation at the operating station. Opening of switch 7CR-2 deenergizes solenoid B, stopping the advance of pusher 104. Closing of 7CR-3 is ineffective because of normally-open 12CR-1, and closing of 7CR-4 is ineffective because both 2CR-1 and 7CR-1 are now open. Completion of the operation closes switch LS8, energizing relay 12CR and closing switch 12CR-1 to reenergize solenoid B and continue the advance of pusher 104.

When switch LS6 is closed by the advance of carrier 108, the latching coil of relay 8CRL is energized, changing and latching all of the 8CR switches. Opening of 8CR-1 deenergizes 5CR, returning it to its original condition and the opening of 8CR-2 as well as 5CR-2 deenergizes solenoid B so that pusher 104 is stopped by the closing of the oil check valve in piston 148. Closed 8CR-3 together with closed 4CR-1 energizes solenoid C to reverse air valve 143 and energizes relay 11CR to open 11CR-1 and deenergize clamping solenoids 84, 86. It also deenergizes solenoid A, which together with energization of solenoid E raises auxiliary frame 30. Closing of 8CR–4 energizes relay 9CR through now-closed 4CR–3 and normally closed 10CR–1 to start a second operation at the operating station. Completion of the operation actuates switch LS8 again, but the closing of 12CR–1 has no effect because 8CR–2 is now open. The closing of 12CR–2 energizes the latching coil of relay 10CRL to latch 10CR–1 in the open position so that 9CR cannot be energized to start a further operation at the operating station. Switch 10CR–1 will be closed, in readiness for further operations, by energizing unlatching coil 10CRU through the closing of either 6CR–1 or 11CR–2. Switch 6CR–1 is closed when 6CR is energized along with solenoid B, while 11CR–2 is closed when 11CR is energized along with solenoids C and E. When the carrier reaches the end of its return stroke, LS7 is closed, energizing unlatching coils of relays 7CRU and 8CRU, returning all of the 7CR and 8CR switches to their original positions. Solenoid D is also energized to actuate air valve 143 to the position to advance carrier 108, the latter being restrained by oil piston 148 with its now-closed check valve.

The apparatus is now in condition to repeat.

Although specific embodiments of the invention have been described herein, it is not intended to limit the invention solely thereto, but to include all of the obvious variations and modifications within the spirit and scope of the appended claims.

What is claimed is:

1. Apparatus for intermittently feeding articles to an operating station which comprises a continuously moving conveyor for supporting and advancing articles to a transfer station, a stop mounted adjacent said station in the path of said advancing articles for stopping each article while said conveyor continues to advance, a pusher mounted adjacent said transfer station for movement transversely of the direction of travel of said conveyor for pushing each said article from said transfer station to said operating station, drive means for advancing and retracting said pusher, means to stop the advance of said pusher short of its ultimate position and for causing said pusher to dwell temporarily at said stop before resuming its advance, and means for temporarily holding the next successive article on said conveyor in a position spaced from said transfer station to permit said pusher to complete its movement before said next successive article reaches said transfer station.

2. Apparatus as defined in claim 1 in which said article comprises a stack of individual items and said stop includes a vertical abutment arranged to square each stack as it arrives at said transfer station.

3. Apparatus as defined in claim 1 including means for operating on said article at said operating station, and means for actuating said drive means responsive to said operating means.

4. Apparatus for intermittently feeding articles to an operating station which comprises a first continuously moving conveyor for supporting and advancing articles, a first stop mounted adjacent said conveyor in the path of said articles for halting the advance thereof, a second continuously moving conveyor for supporting and advancing said articles from adjacent said first stop transversely of the direction of advance of the first said conveyor to a transfer station, a second stop mounted adjacent said transfer station in the path of said advancing articles for halting the advance thereof, one of said conveyors comprising at least one endless element mounted on a pair of spaced pulleys and having an upper reach for supporting said articles, and the other of said conveyors comprising at least one roll mounted for rotation adjacent said first conveyor about an axis parallel to said endless element, said roll being adapted to support said articles on its upper periphery, means responsive to arrival of an article at said first stop for changing the relative level of said conveyors to bring said second conveyor into contact with the bottom of said article at said first stop and to withdraw said first conveyor from contact with said article, a pusher mounted adjacent said transfer station for movement transversely of the direction of travel of said conveyor for pushing each said article from said transfer station to said operating station, drive means for advancing and retracting said pusher, means to stop the advance of said pusher short of its ultimate position and for causing said pusher to dwell temporarily at said stop before resuming its advance, and means for temporarily holding the next successive article on one of said conveyors in a position spaced from said transfer station to permit said pusher to complete its movement before said next successive article reaches said transfer station.

5. Apparatus as defined in claim 4 including a plurality of said endless members and a plurality of said rolls intercalated with each other.

6. Apparatus as defined in claim 4 in which each said article comprises a stack of individual items and each said stop comprises a vertical abutment arranged to square one side of each stack abutting thereagainst.

7. Apparatus as defined in claim 4 including means for operating on said article at said operating station, and means for actuating said drive means responsive to said operating means.

8. A pusher mounted for movement to and from a transfer station and an operating station to push an article from said transfer station to said operating station comprising a pneumatically actuated rack driving a first pinion, means for controlling the movement of said rack including a hydraulic cylinder, a piston in said cylinder mounted for movement with said rack, and a valve for controlling the flow of liquid in said cylinder, a second pinion of diameter different from the first mounted for rotation therewith, an endless chain driven by said second pinion having a reach extending in the direction of travel of said pusher from adjacent said transfer station to adjacent said operating station, a track extending parallel to said reach, and a slide member for engaging said article slidably mounted on said track and secured to said chain.

9. A pusher as defined in claim 8 in which said second pinion has a diameter greater than the first to provide an extent of travel of said slide member greater than the extent of travel of said rack.

10. A pusher as defined in claim 8 in combination with means for operating on said article at said operating station, and means responsive to said operating means for controlling said pneumatically actuated rack.

References Cited in the file of this patent

UNITED STATES PATENTS

| 1,631,125 | Happel | June 7, 1927 |
| 2,638,272 | Marsden | July 13, 1954 |
| 2,947,405 | Feuton | Aug. 2, 1960 |

UNITED STATES PATENT OFFICE
CERTIFICATE OF CORRECTION

Patent No. 3,067,851            December 11, 1962

John F. O'Rourke, Jr.

It is hereby certified that error appears in the above numbered patent requiring correction and that the said Letters Patent should read as corrected below.

In the grant, line 1, and in the heading to the printed specification, line 3, for "John R. O'Rourke, Jr.", each occurrence, read -- John F. O'Rourke, Jr. --; in the drawings, Sheets 1 to 5, line 1, for "J. R. O'Rourke, Jr", each occurrence read -- J. F. O'Rourke, Jr --; column 8, lines 64 and 65, for 2,638,272    Marsden-------July 13, 1954

2,947,405    Feuton--------Aug. 2, 1960 read 2,683,272    Marsden------July 13, 1954

2,947,405    Fenton-------Aug. 2, 1960

Signed and sealed this 20th day of August 1963.

(SEAL)
Attest:
ERNEST W. SWIDER
Attesting Officer

DAVID L. LADD
Commissioner of Patents